United States Patent [19]

Copeland et al.

[11] 4,136,433
[45] Jan. 30, 1979

[54] INSULATION FEEDING, CUTTING AND INSERTING MACHINES

[75] Inventors: Francis E. Copeland, Casstown; Glen E. Bucholtz; Hyman B. Finegold, both of Dayton, all of Ohio

[73] Assignee: The Globe Tool and Engineering Company, Dayton, Ohio

[21] Appl. No.: 847,099

[22] Filed: Oct. 31, 1977

[51] Int. Cl.² .................. B23Q 41/02; H02K 15/00
[52] U.S. Cl. .................. 29/564.6; 29/33 L; 29/734
[58] Field of Search .......... 29/564.1, 564.2, 564.6, 29/33 K, 33 L, 596, 734, 732

[56] References Cited
U.S. PATENT DOCUMENTS 3,616,512  11/1971  Appenzeller et al. ............. 29/564.6
3,634,932  1/1972  Mason ............................. 29/564.6

Primary Examiner—Gil Weidenfeld
Attorney, Agent, or Firm—Dybvig & Dybvig

[57] ABSTRACT

The several machine functions required to feed, cut, and insert insulating wedges into armature slots are accomplished with the use of a single drive motor that drives a control cam and a Scotch yoke mechanism. The machine is of simple construction and capable of high speed operation. By minor modification, the same machine can be used for feeding, cutting and inserting armature cell insulating liners.

The machine includes an improved armature index mechanism especially adapted for high speed indexing in which the index pawl enters succeeding armature slots while traveling at zero velocity in the direction of its indexing movement.

9 Claims, 11 Drawing Figures

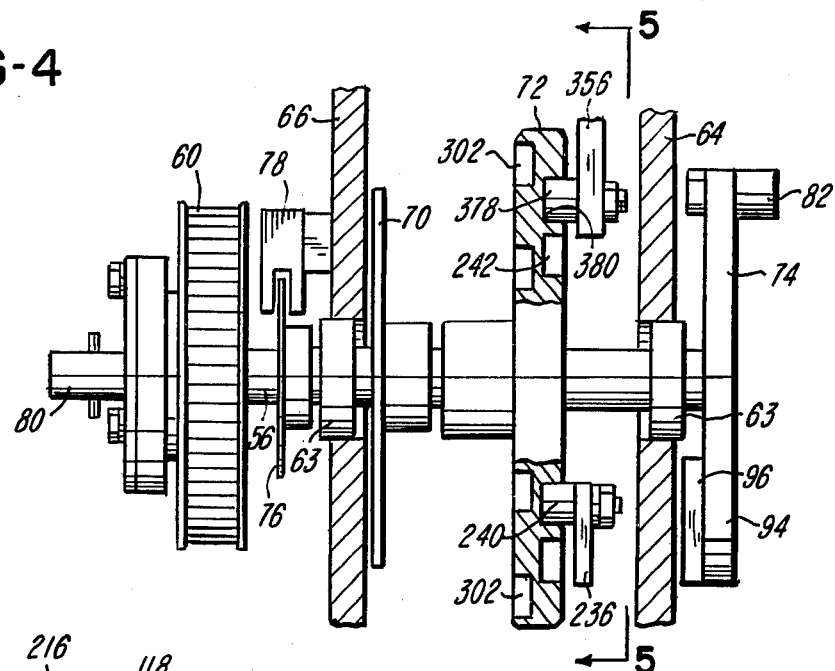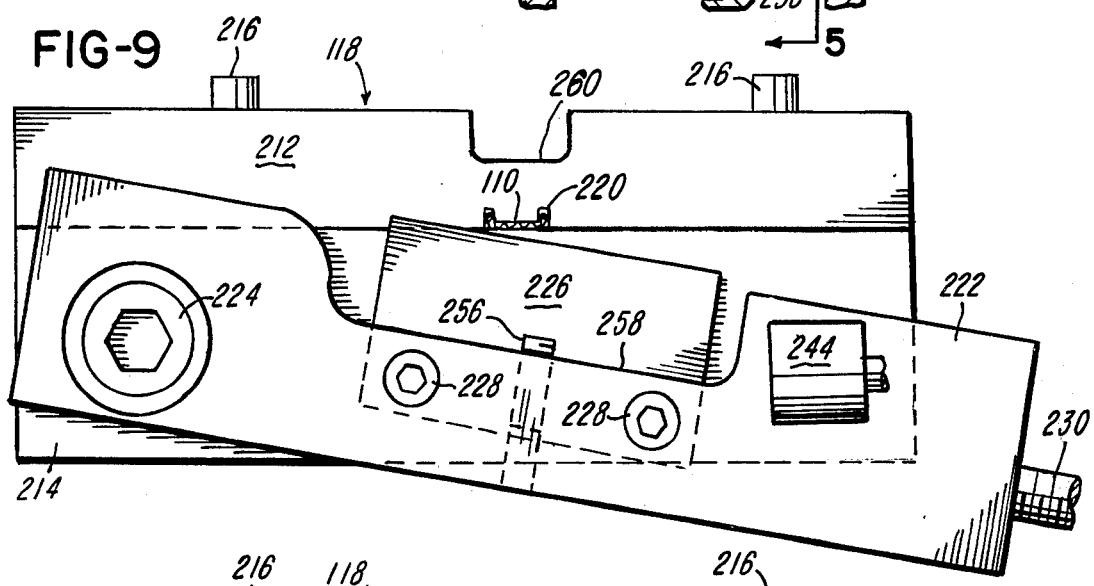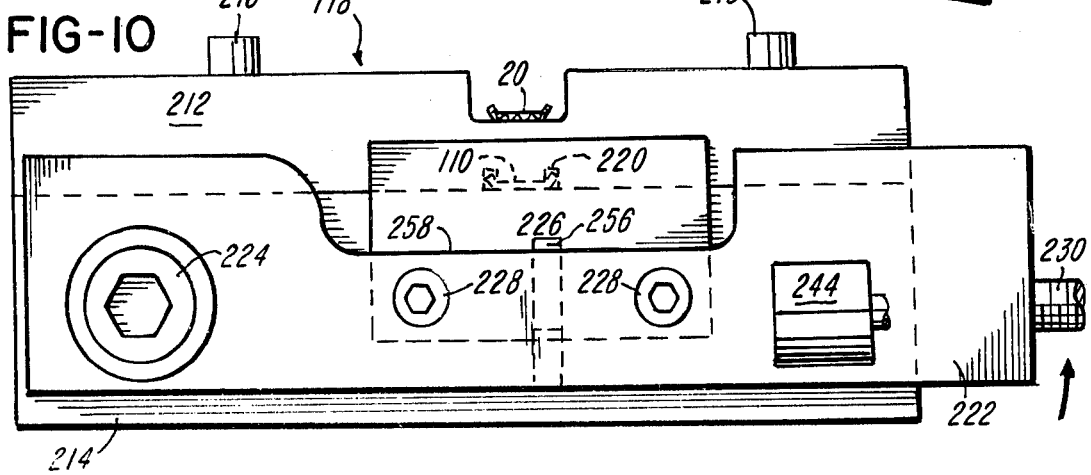

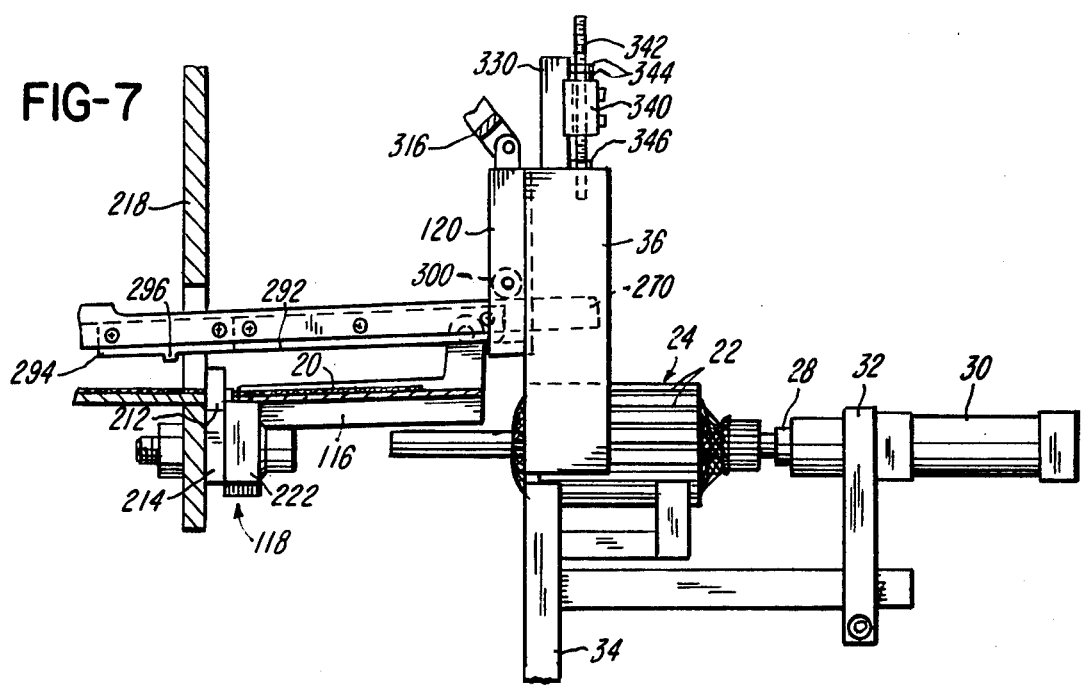
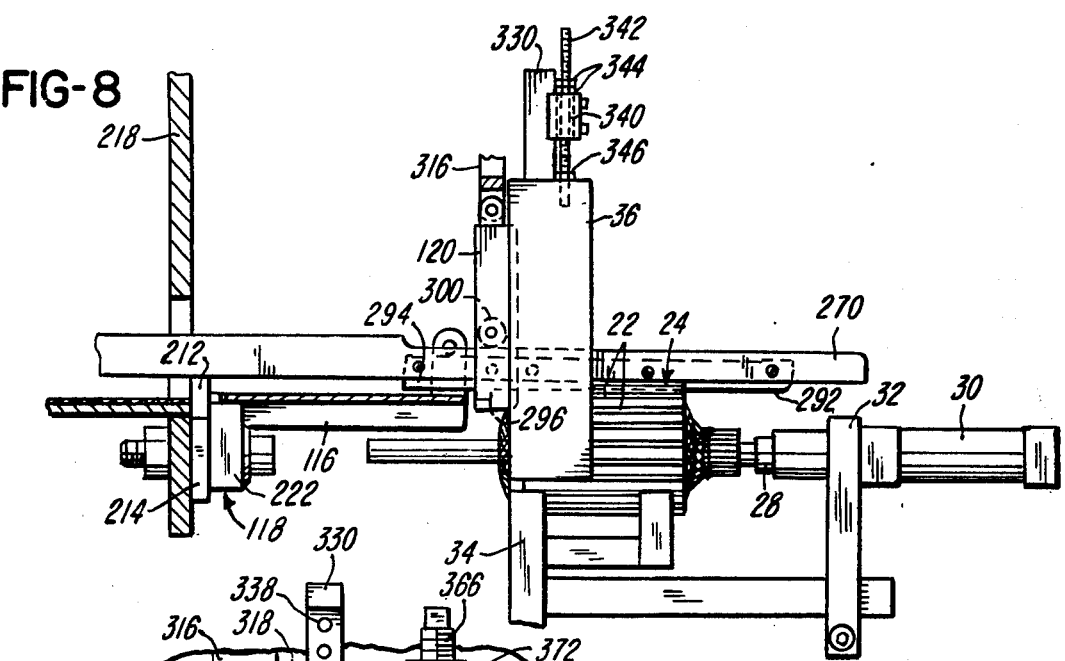
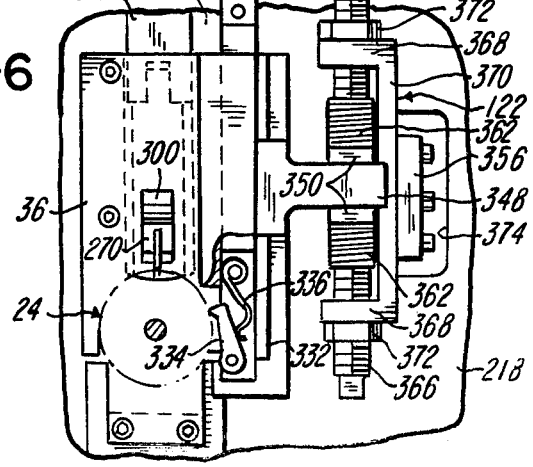

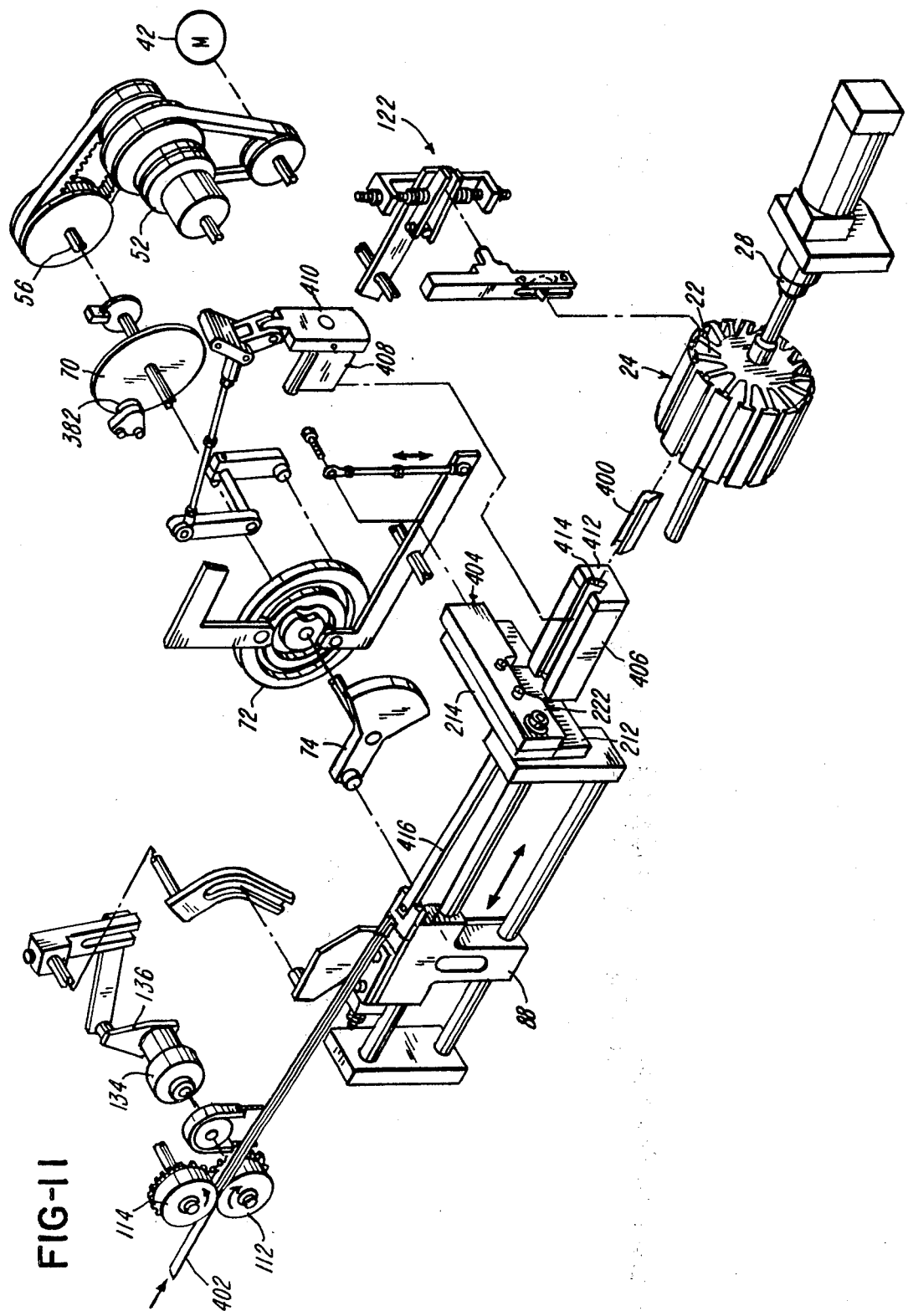

INSULATION FEEDING, CUTTING AND INSERTING MACHINES

BACKGROUND OF THE INVENTION

This invention relates to insulation feeding, cutting and inserting machines and more particularly to machines for providing electromagnetic devices such as armatures with slot or cell liners and insulating wedges.

Several machine motions must occur in predetermined timed sequences to accomplish the insertion of cell liners or insulating wedges into, for example, armature core slots. It has been typical in the past to utilize a reciprocating ram for inserting the insulating members, the ram being designed to initiate the various other functions.

SUMMARY OF THE INVENTION

This invention provides an improved machine for feeding, cutting and inserting insulating wedges or liners which may be manufactured less expensively than prior machines yet is rugged and capable of high speed operations. A superior machine may be produced by utilizing a rotating control cam and cam follower arrangements for causing some of the machine functions to occur and a Scotch yoke arrangement for other machine functions, the ram being driven by the Scotch yoke. Also it is convenient to utilize a cam follower responsive to movement of a Scotch yoke-driven car. It then becomes a relatively simple matter to provide for the necessary timing of the sequence of the operations and to change the sequence of timing to suit the application of the machine.

A machine constructed in accordance with this invention can be mounted on a simple table with the operative parts mounted on a pair of upright frame plates. The typical expensive castings for the frames of machines previously marketed are thus avoided.

To achieve high speed operation, it is necessary to have a rugged and reliable index mechanism for indexing the armature or other dynamoelectric member. Prior indexing mechanisms generally employed an indexing pawl that moves in a linear direction while being biased toward the armature core. During its linear movement, the pawl rests against the core until it passes an armature slot whereupon it is biased into the slot. Upon continued movement, the pawl strikes the margin of the slot and then pushes against the margin of the slot to cause the index. Occasionally the pawl, which is moving at relatively high speed, may skip over a slot so that the index will not occur. The striking of the pawl against the slot at high speed is a source of wear.

The machine of this invention includes an improved mechanism capable of high speed operation designed so that the pawl will enter an armature slot at a time when it is not moving in a direction to cause an index. Accordingly, the problem of a pawl skipping over a slot is avoided. When the pawl first engages the margin of the slot, it is moving at a relatively low speed rather than a high speed and machine wear is thus reduced.

Other objects and advantages will become apparent from the following description.

BRIEF DESCRIPTION OF THE DRAWINGS

FIG. 4 is a cross sectional view taken along section line 4—4 of FIG. 2. In FIG. 4 the crank and counterbalance of the Scotch yoke are shown 90° displaced from FIG. 2. Also the scale of FIG. 4 is larger than FIGS. 2 and 3.

FIG. 6 is a front elevational view of a portion of the machine shown in FIG. 3 and further illustrating an armature in position for receiving wedges and portions of an armature indexing mechanism omitted from FIG. 3.

FIG. 7 is a side elevational view of a portion of a wedge inserting mechanism forming part of the machine in one position of operation thereof.

FIG. 8 is a side elevational view of the parts of the wedge inserting mechanism shown in FIG. 7 illustrated in another position of operation thereof.

FIG. 9 is a front elevational view showing a knife assembly for cutting the wedge material with parts shown in one position of operation thereof.

FIG. 10 is a front elevational view of the knife assembly of FIG. 9 with parts shown in another position of operation thereof.

FIG. 11 is an exploded perspective view similar to FIG. 1 but illustrating a machine for inserting cell insulating liners into unwound armatures.

DESCRIPTION OF THE PREFERRED EMBODIMENTS

Figure 1:
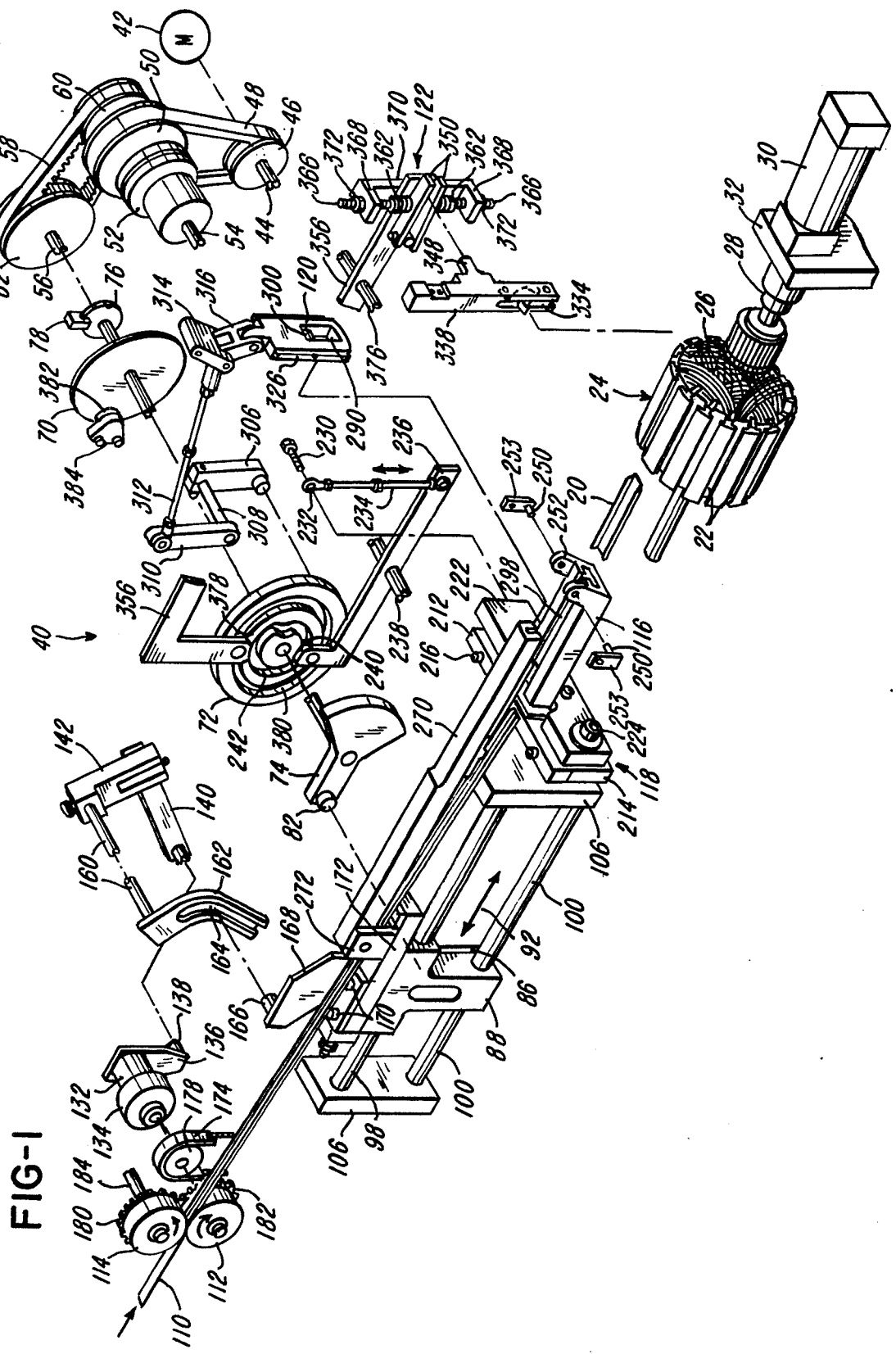
FIG. 1 is an exploded perspective view of portions of a wedge inserting machine in accordance with this invention.

Referring first to FIGS. 1–10 and especially FIG. 1, a wedge inserting machine in accordance with this invention is intended for inserting an insulating wedge 20 into the laminated core slots 22 of a wound armature generally designated 24. The wedges 20 overlie the coils 26 in the slots 22.

Figure 2:
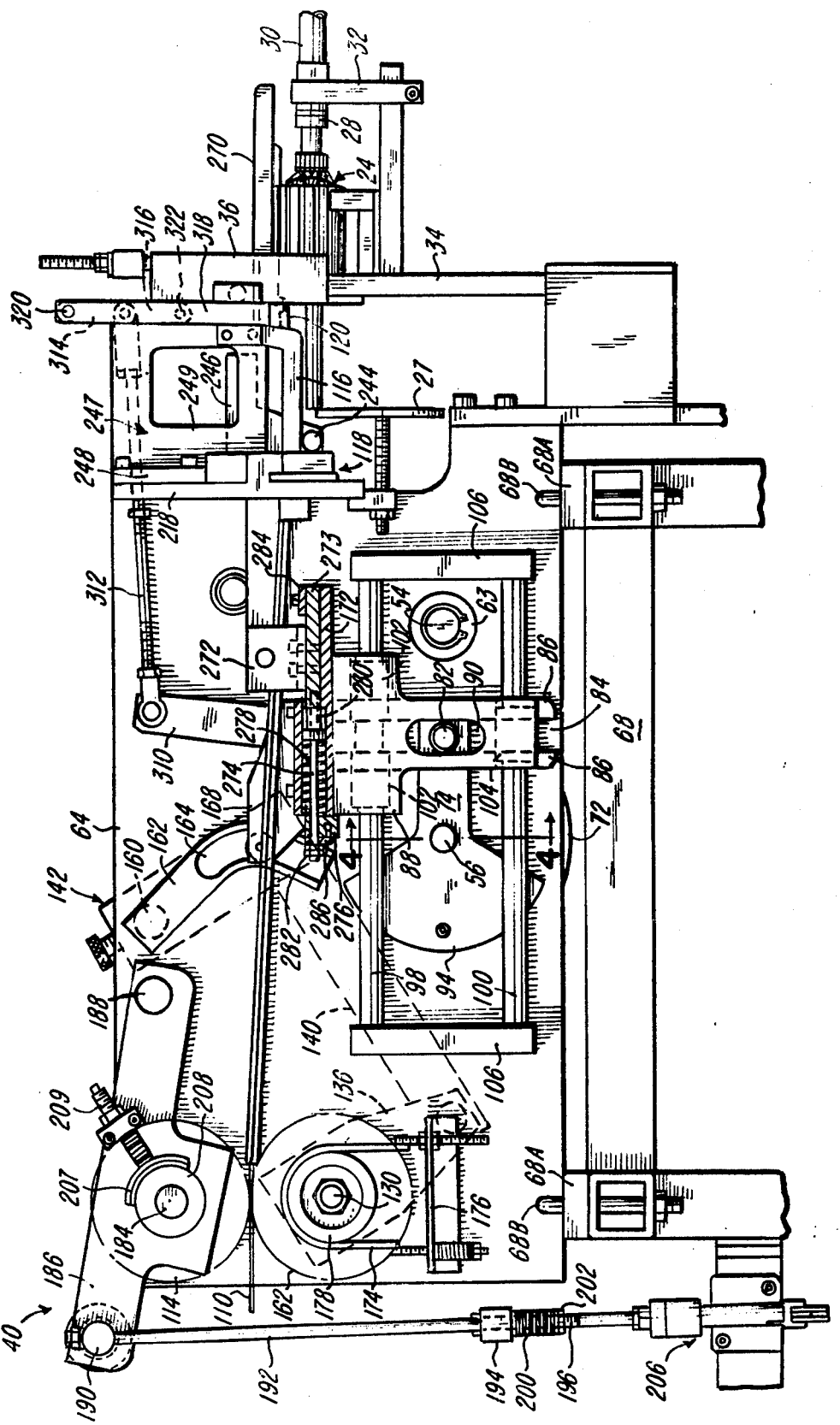
FIG. 2 is a side elevational view of the wedge inserting machine. In this figure and in others, parts have been broken away or omitted for the purpose of more clearly illustrating certain features.

With reference also to FIG. 2, the armature 24 is held in position to receive wedges between an adjustably fixed stop disc 27 and a movable stop 28 mounted on an air actuator 30 that is supported by a bracket assembly 32 on a sliding lower chuck 34. The upper end of the sliding chuck is shaped to engage the outer periphery of the armature core and cooperates with a fixed upper chuck 36 to grip the armature. The sliding lower chuck 34 is movable up and down in any suitable fashion and it may be provided with an extension 38 used for armatures having longer lamination stack heights. The details of construction of the chucks and stops for holding the armature in place are not important to this invention and are not further illustrated or described. However, as will be described further below, the armature is indexed about its axis after each wedge is inserted. Accordingly, the chucks should not so tightly grip the armature as to prevent its rotation.

With continued reference to FIG. 1, the machine of this invention is generally designated 40 and comprises a drive motor 42 having a motor output shaft 44 for a drive pulley 46 connected by a V-belt 48 to a larger diameter driven pulley 50. The driven pulley 50 is connected by an air operated clutch assembly 52 to a high speed or clutch shaft 54. The shaft 54 is connected to a lower speed machine or main drive shaft 56 by a timing belt 58 and timing pulleys 60 and 62.

Figure 3:
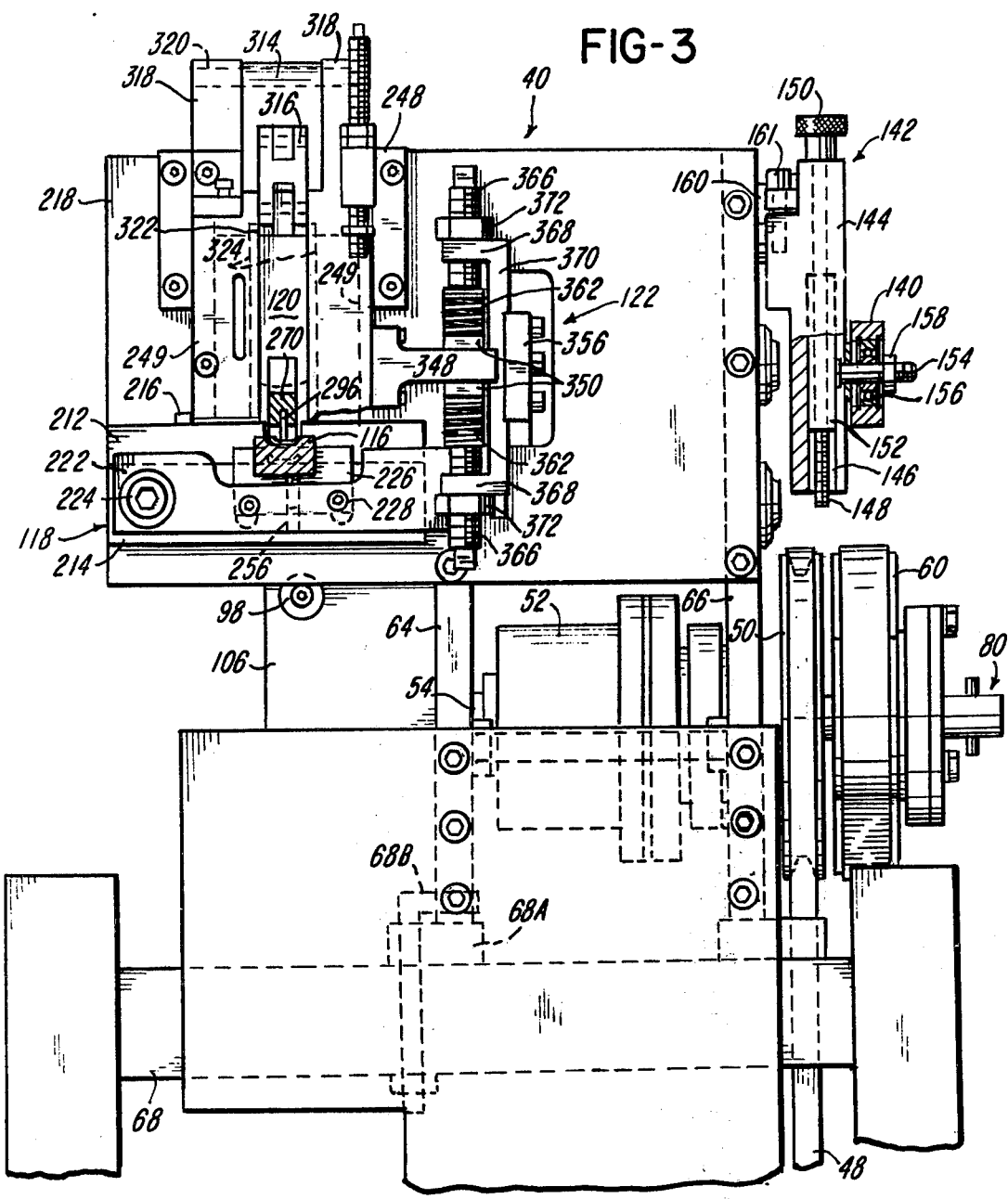
FIG. 3 is a front elevational view of the machine.
Figure 5:
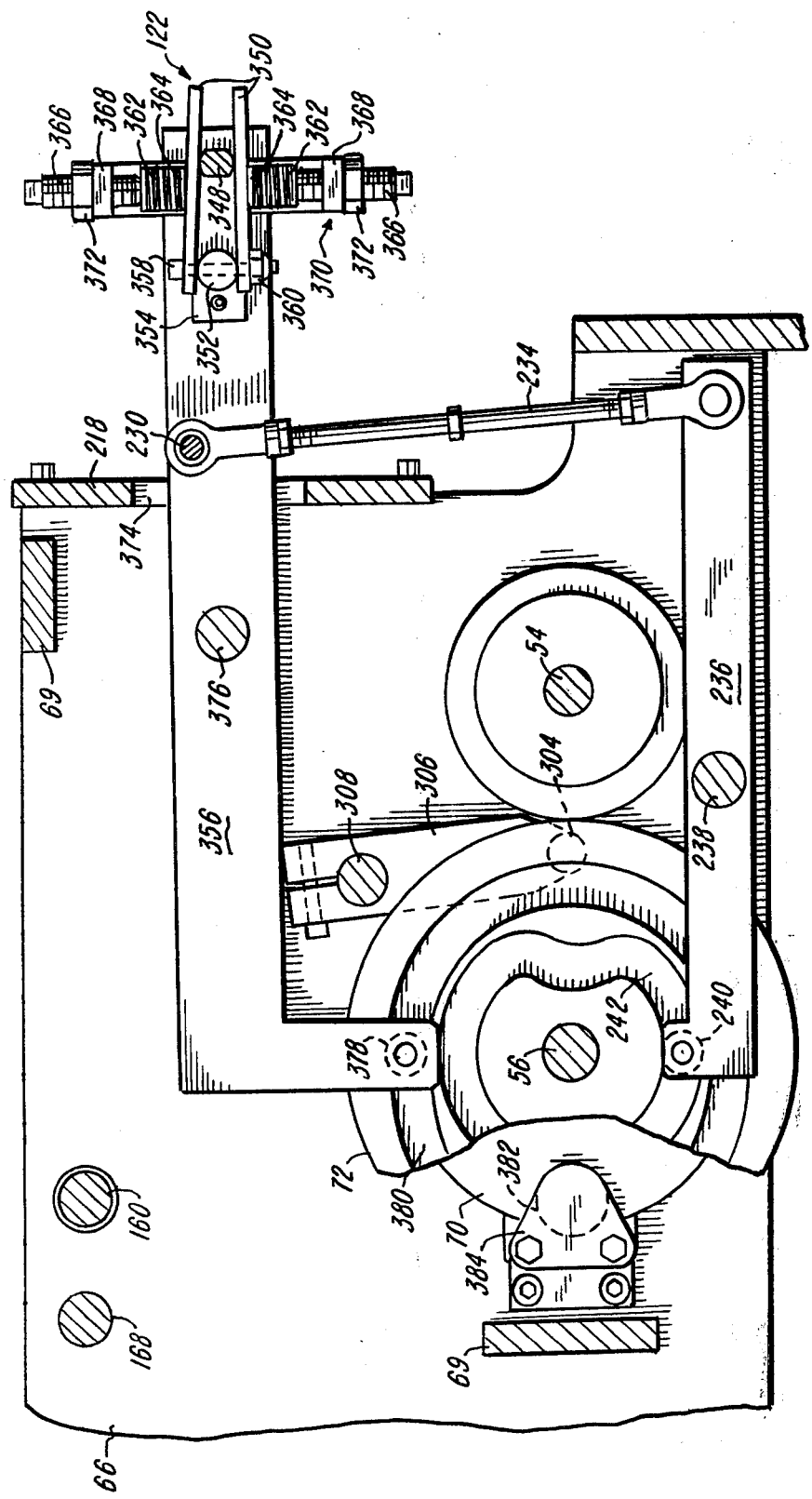
FIG. 5 is a cross sectional view of a portion of the machine taken in the direction of arrows 5—5 of FIG. 4.

With reference to FIGS. 2-4, the clutch shaft 54 and the main drive shaft 56 are journalled for rotation by bearings 63 in a pair of spaced vertically upright frame plates 64 and 66, respectively, that are mounted on a table 68 shown in FIGS. 2 and 3, and held in spaced apart relation by plural spacer plates 69 such as are shown in FIG. 5. The table 68 may be constructed from rectangular tubing and have mounting pads 68A on which the frame plates 64 and 66 are mounted by clamps 68B. (FIGS. 2 and 3) With reference to FIGS. 1 and 4, the main drive shaft 56 is keyed to the hubs of a brake disc 70 and a sequence control cam 72. In addition, the main drive shaft 56 is welded to a counterweighted crank arm 74 for a Scotch yoke drive mechanism that will be described below. Also there is a sensing disc 76 clamped to the main drive shaft 56 for forming part of a proximity switch assembly 78 for indicating the shaft position in a well known manner. The proximity switch assembly 78 is used with machine control circuitry for counting and controlling the operating sequence of the machine. The machine control circuitry is not illustrated herein because it may be entirely conventional and may take various forms as will be understood by those familiar with the art. A conventional attachment 80 for hand cranking may be attached to the end of the main drive shaft 56 opposite the crank arm 74.

With reference to FIGS. 1 and 2, the crank arm 74 carries a drive pin or cam follower 82 that is trapped for sliding movement in a slot 84 between two plates 86 that form the Scotch yoke and are affixed to the rear face (as viewed in FIG. 2) of a carriage 88. The carriage 88 is slotted at 90 to reduce its weight and, coincidentally, the drive pin or cam follower 82 is visible therethrough in FIG. 2. As well known to those familiar with Scotch yoke drives, such drives are well suited to convert steady rotation of the main drive shaft 56 to harmonic reciprocal movement of the carriage 88 in the directions indicated by the arrows 92 in FIG. 1. The reciprocal motion of the carriage 88 is effectively counterbalanced by a counterweight portion 94 of the crank arm 74. As shown in FIG. 4, the counterweight portion 94 may carry added weight in the form of a plate 96 affixed thereto. Since the motion of the carriage 88 is opposed by the counterweight portion 94, vibrations often associated with Scotch yoke drive mechanisms are substantially reduced.

With continued reference to FIGS. 1 and 2, the carriage 88 is apertured to receive an upper guide rod 98 and a lower guide rod 100 and a pair of upper bearings 102 and a lower bearing 104 surrounding the guide rods. The guide rods 98 and 100 may be mounted on the frame plate 64 by a pair of support plates 106.

In operation, the reciprocating motion of the carriage 88 is used to advance a strip of insulating material 110 from a supply coil (not shown) through a pair of paper forming and feed rolls 112 and 114 respectively into a wedge guide cavity 116 past a knife assembly 118, and, ultimately, advance the cut wedge 20 into an armature slot 22. In proper timed relation, the sequence control cam 72 operates the knife assembly 118, a coil end turn depressor 120, and an armature indexing mechanism generally designated 122.

Referring to FIGS. 1 and 2, the lower paper forming and feed roll 112 is mounted on a roll drive shaft 130 mounted for rotation in a bearing (not shown) in the frame plate 64 and a bearing 132 in the frame plate 66. The roll drive shaft 130 is intermittently driven by an overriding clutch 134 having a clutch operating arm 136 connected by a pin 138 and a fixed link 140 to an adjustable lever assembly 142. As best shown in FIG. 3, the lever assembly 142 comprises a generally rectangular body 144 that has a vertical bore 146 which receives an elongate adjustment screw 148, the upper end of which is affixed to an adjusting knob 150. The right side of the body 144 is slotted and an internally threaded sleeve or "tee" nut 152 rides on the adjustment screw 148. The tee nut includes an externally threaded connecting pin 154 projecting at right angles to the adjusting screw 148 through a bearing 156 in the end of the fixed link 140. A nut 158 threaded on the connecting pin 154 maintains the connection between the fixed link 140 and the tee nut 152.

The adjustable lever 142 is affixed to an elongate paper feed drive shaft 160 by a clamp 161 bearing against a flat on the drive shaft 160 and bolted to the lever body 144. The drive shaft 160 is mounted in the frame plates 64 and 66 and welded to a paper feed cam 162. The feed cam 162 comprises an elongate arcuate plate having an arcuate cam channel 164 cut in one face thereof and extending along a substantial portion of its length. A pin-like cam follower 166 rides in the cam channel 164. It is mounted by a bracket 168 connected by bolts 170 to a support member 172 fixed to the top of the Scotch yoke carriage 88.

In operation, the lower forming and feed roll 112 is incrementally driven in a clockwise direction as indicated by the arrow marked thereon in FIG. 1 in response to the clockwise rotation of the clutch operating arm 136 which in turn is in response to clockwise rotation of the adjustable lever assembly 142 about the axis of the paper feed drive shaft 160. The clockwise direction of rotation of the shaft 160 occurs upon the rearward stroke, i.e., left as viewed in FIGS. 1 and 2, of the Scotch yoke carriage 88 which causes, by virtue of the engagement of the cam follower 166 in the cam channel 164, a clockwise rotation of the paper feed cam 162. During the forward stroke of the carriage 88, the paper feed cam 162 rotates in a counterclockwise direction with a consequent movement of the clutch operating arm 136 in a counterclockwise direction. However, such motion is not imparted to the lower feed roll 112 because the overriding clutch 134 is incapable of driving the roll drive shaft 130 in that direction. Furthermore, to protect against excess rotation of the roll drive shaft 130, its rotation is resisted by means of a spring biased brake band 174 connected to a mounting bracket 176 to the frame plate 64 and passing over a brake drum 178 keyed to the roll drive shaft 130.

As a result of the paper feed structure described above, the lower paper forming and feed roll 112 is positively driven through predetermined angular increments in a clockwise direction as viewed in FIGS. 1 and 2 during each rearward stroke of the carriage 88. The length of the increments is determined by the separation between the tee nut 152 of the adjustable lever assembly 142 and the paper feed drive shaft 160. As will become apparent below, the length of the wedge 20 is determined by the length of the increment through which the lower roll 112 is driven. The stroke of the carriage 88 is substantially longer than that required to rotate the lower feed roll 112. Accordingly, the cam channel 164 is so designed and shaped to provide for substantial lost motion so that the elongate cam plate 162 will not be pivoting throughout the entire rearward stroke of the carriage 88.

The upper paper forming and feed roll 114 is connected to the lower feed roll 112 by intermeshing gears 180 and 182 and is mounted on a shaft 184 journalled for rotation in the arms of a yoke 186 mounted by a pivot pin 188 on the frame plate 64. A pin 190 extends through the rearward or free end of the yoke 186 and a pair of tension rods 192 depend therefrom. Only one rod 192 can be seen in FIG. 2 because the other rod is hidden. The lower ends of the rods 192 project through apertures adjacent the opposite ends of a rectangular plate 194 and the lower ends of the rods are threaded as indicated at 196. Each rod 192 is provided with an abutment 198 against the lower surface of which the rectangular plate 194 is biased by springs 200 trapped on the lower ends of the rods 192 by nuts 202. An operating rod 204 is connected to the center of the rectangular plate 194 intermediate the apertures receiving the tension rods 192. The operating rod 204 is moved vertically by a toggle clamp assembly 206 which may be a conventional, purchased item and accordingly is not described in detail herein. When the operating rod 204 is moved downwardly by the clamp assembly 206, the upper feed roll 114 is firmly pressed against the lower roll 112. The pressure applied between each side of the feed rolls may be adjusted by adjustment of the nuts 202 on the tension rods 192. Excess rotation of the upper roll 114 is prevented by a friction brake shoe 207 that bears against a break drum 208 on the shaft 184. The shoe 207 is adjustably positioned by a threaded shaft 209 mounted on the yoke 186.

The feed rolls are so shaped as to form the insulating strip 110 into substantially the desired final shape. The formed strip 110 moves along a guide channel 210 mounted on the frame plate 64 and into the aforementioned wedge guide cavity 116. While the carriage 88 is continuing its rearward stroke, the knife assembly 118 is operated to cut the length of the insulating strip within the guide cavity 116 from the rest of the strip. The knife assembly 118 shown in FIGS. 1, 3, 9, and 10 includes a pair of fixed plates 212 and 214 held together by vertical bolts 216. The plates 212 and 214 are both affixed to a tooling support plate 218 mounted on the front end of the main frame plates 64 and 66. The confronting surfaces of the plates 212 and 214 are formed to define a centrally located channel 220 therebetween through which the insulating strip 110 extends. The knife assembly 118 further includes a movable knife plate 222 mounted by a pivot pin 224 on the lower fixed knife plate 214 and carrying a knife insert or blade 226 connected thereto by bolts 228. Referring to FIG. 1, the edge of the movable knife plate 222 opposite the pivot pin 224 is provided with a tapped hole (not shown) for receiving a threaded bolt 230 which extends through an eyelet 232 at the upper end of a knife operating rod 234, the lower end of which is similarly bolted to the free end of a knife operating link 236 that is keyed to a shaft 238 that is in turn mounted by bearings (not shown) in the main frame plates 64 and 66. The other end of the link 236 carries a cam follower 240 trapped in a knife operating cam channel 242 formed in the face of the control cam 72 confronting the main frame plate 64. (See FIGS. 1, 4 and 5.)

The operation of the knife assembly 118 is as follows. After the desired length of the insulating strip material 110 is inserted into the guide cavity 116 and the feed rolls stop rotating, the pivoted knife operating link 236 is caused to rotate in a counterclockwise direction whereupon the knife operating rod 234 is moved upwardly and the knife plate 222 is caused to move in a counterclockwise direction from its lower position shown in FIG. 9 to its upper position shown in FIG. 10. This causes the upper edge of the knife insert or blade 226 to move past the channel 220 formed between the fixed plates 212 and 214 to shear off the portion of the insulating strip 110 within the cavity 116. To insure that a clean shear is obtained, the movable knife plate 222 may be biased toward the fixed plates 212 and 214 by a backup roller 244, shown in FIG. 2, mounted on a bracket 246. The bracket 246 is pivotal or otherwise adjustably mounted on a tooling mounting frame assembly 247 so that the position of the backup roller 244 may be adjusted. The tooling mounting frame assembly 247 comprises a weldment formed from a rear plate 248 bolted to the tooling support plate 218 and a pair of spaced side plates 249 that lie in parallel to the main frame plates 64 and 66. The forward ends of the side plates 249 are preferably interconnected by a brace plate (not shown).

As shown in FIGS. 1 and 2, the wedge guide cavity 116 is pivotally mounted at its forward end by pivot pins 250 projecting into apertured ears 252 formed on the cavity 116. The pins 250 are mounted by plates 253 to the tooling mounting frame side plates 249. The rearward end of the wedge guide cavity 116 rests upon the end of a vertical set screw 256 that is threaded in the center of the movable knife plate 222 and extends slightly above a recessed shoulder 258 formed centrally of the movable knife plate 222. When the movable knife plate 222 is pivoted upwardly or in a counterclockwise direction (as viewed in FIGS. 9 and 10) to shear the insulating strip 110, the rearward end of the guide cavity 116 is moved upwardly and its upward movement continues until the rearward end of the cut wedge 20 is aligned with a notch 260 cut in the center of the upper fixed knife plate 212. When so positioned, the wedge 20 is located so that it can be inserted into an armature slot 22 as described below.

Referring to FIGS. 1, 2, 7 and 8, the wedge 20 is moved from the guide cavity 116 into an armature slot 22 during the forward motion of the Scotch yoke carriage 88 by operation of a ram 270. The ram 270 comprises an elongate member which is U-shaped in cross section throughout a substantial portion of its length. The rearward end of the ram 270 is pivotally mounted to an L-shaped bracket 272 that is bolted to a slidable rod 273 (FIG. 3) that is slidably mounted in a longitudinally extending channel formed in the top surface of the carriage mounted support plate 172. The position of the sliding rod relative to the support plate 172 and accordingly the carriage 88 can be accurately adjusted by means of an adjusting rod 274 which is connected to the slidable plate 273 and which has a threaded end extending rearwardly of the support plate 172 and also rearwardly of a manifold block 276 that is bolted to the rear face of the support plate 172. A compression spring 278 surrounds the adjusting rod 274 and is located in the channel between the manifold block 276 and a T-shaped spring spacer 280 that also surrounds the rod 274 and abuts the rear face of the slidable plate 273. As apparent, adjustment of a pair of nuts 282 threaded onto the rod 274 accurately determine the position of the slidable member 273 relative to the support plate 172. The slidable plate 273, the adjusting rod 274 and the spring 278 are held within the channel by the bracket 168 and a clamp plate 284 that overlies the support plate 172.

The mounting of the ram 270 on the slidable plate 273 provides a safety feature in the event the ram 270 should become jammed during the forward motion of the carriage 88. In such event, the compression spring 278 will be compressed so that the ram 270 will not travel in the forward direction with the carriage 88. A source of air under pressure cooperating with an air pressure responsive switch (not shown) is connected to an air passageway in the manifold block 276 that is normally closed by a washer 286 trapped between the adjusting nuts 282 and the manifold block 276. The switch is so designed and utilized in the machine control circuitry that, in the event of a drop in air pressure, the switch will be activated and disable the operation of the machine. A drop in air pressure will occur in the event the ram 270 becomes jammed because the manifold block 276 will move forwardly away from the adjusting nuts 282. The pressurized air within the manifold block 276 will then be released to atmosphere because the washer 286 will no longer be held thereagainst.

The ram 270 is so mounted that it lies substantially parallel to the path of movement of the insulating strip 110 and, assuming that no jam occurs, is caused to move in the same direction as the insulating strip with the carriage 88. Intermediate its ends, the ram 270 projects through an aperture 290 in the depressor 120 and, as will be described below, the depressor during its operation moves vertically to raise and lower the ram. Mounted internally of the ram 270 and adjacent its forward end are a pair of longitudinally extending plates 292 and 294. The forwardmost plate 292 is the longer of the two plates and it projects below the bottom surface of the ram 270. Its function is to slightly depress the radially outermost wires in an armature slot to prepare for the forcing of the wedge into the slot. The plate 294 is located immediately behind the plate 292 and is provided with a downwardly projecting tang 296. The tang 296 is shaped to enter a slot 298 in the top of the wedge guide cavity 116 behind the cut wedge and to force the wedge into an armature slot upon forward movement of the ram 270. At the end of the return or rearward motion of the ram 270, as shown in FIG. 7, the tang 296 is located rearwardly of the knife assembly 118 and the tooling mounting plate 218. Accordingly, during the forward motion of the ram 270, the tang 296 can engage behind the cut wedge 20 by passing through the notch 260 in the uppermost fixed knife plate 212. Upon continued forward motion of the ram 270, the cut wedge 20 is pushed completely out of the guide cavity 116 and into an armature core slot. The forward position of the ram 270 and the tang 296 is shown in FIG. 8. When the parts are in this position, the insertion of a wedge has been completed.

With reference to FIGS. 1 and 8, a roller 300 is located in the upper end of the depressor aperture 290. During the forward motion of the ram 270, the roller 300 bears on the top of the ram so that the forwardmost plate 292 carried by the ram will be under pressure and depress the wire in the armature slot and the tang 296 will engage and push the wedge. During this forward travel of the ram 270, it may be supported by support surfaces (not shown) in the depressor aperture 290.

During rearward travel of the ram 270, when the insulating strip 110 is being fed into the guide cavity 116, the ram must be moved upwardly so that the entry of the insulating strip 110 into the cavity 116 will not be impeded by the tang 296. Accordingly, the depressor 120 is moved upwardly during such rearward travel of the ram, the forward end of the ram being within the depressor aperture 290. The vertical position of the depressor 120 is controlled by a depressor cam channel 302 (FIG. 4) in the face of the sequence control cam 72 confronting the main frame plate 66. The cam channel 302 is engaged by a cam follower 304 on an arm 306 clamped to a shaft 308 journalled in bearings (not shown) in the main frame plates 64 and 66. Connected as by welding to the end of the shaft 308 projected through the plate 64 is a drive link 310 to which the rearward end of a drive rod 312 is pivoted. The forward end of the drive rod 312 is connected to a toggle mechanism comprising an upper link 314 and a lower link 316. The upper link 314 is pivoted to a pair of depressor guide plates 318 (FIG. 3) by a pin 320 and the lower link 316 is pivoted to the top of the depressor 120 by a pin 322.

With reference to FIG. 3, the depressor guide plates 318 have notches or channels 324 extending along their confronting edges in which gibs 326 (FIG. 1) extending along the sides of the depressor 120 are guided. As apparent, pivotal movement of the cam follower arm 306 in a clockwise direction as viewed in FIG. 5 will cause the drive rod 312 to move forwardly thereby causing the depressor 120 to be lowered. When the depressor 120 is lowered, its bottom surface engages and lightly depresses the coil end turns spanning the armature slot 22 that is to receive a wedge. As also described above, it performs the additional functions of holding the ram 270 in its down position for driving the wedge out of the cavity 116 into the armature slot and, when it is raised, of holding the forward end of the ram upwardly during the return or rearward movement of the ram 270.

During the rearward stroke of the carriage 88, the armature is indexed to present the next adjacent slot in position to receive a wedge. This index is accomplished by the index mechanism 122 shown best in FIGS. 1, 5 and 6–8. As shown in FIG. 6, the mechanism 122 includes an index slide bar 330 confined for vertical movement within a channel 332 cut for this purpose in the upper chuck 36. At its lower end, the slide bar 330 carries a conventional index pawl or dog 334 and a spring 336 which biases the dog toward the armature core 24. The dog 334 is so designed that it can engage an armature slot at the lower end of travel of the index slide 330 and, during upward movement of the index slide 330, remain in the slot and cause the armature to rotate. During downward travel of the slide 330, the dog 334 cams out of the armature slot and rides along the armature core laminations between slots. The forward face of the index slide 330 is notched at 338 to receive a stop member 340 bolted thereto. The stop member 340 has a vertically extending aperture that receives, with clearance, a vertically extending threaded rod 342 which is supported in the upper end of the upper chuck 336. Two pairs of stop nuts are threaded onto rod 342 comprising an upper pair of stop nuts 344 and a lower pair 346. As apparent, upward movement of the index slide 330 is limited by the position of the upper stop nuts 344 which are engaged by the upper surface of the stop member 340. Similarly downward movement of the slide 330 is limited by the position of the lower stop nuts 346 that are engaged by the lower surface of the stop member 340.

A drive rod 348 is bolted to the side of the index slide 330 opposite that side from which the index dog 334 projects. As shown in FIG. 5, the drive rod 348 has a "double D" cross section and is trapped between the forward ends of a pair of spring biased index actuator plates 350, the rearward ends of which are loosely pivotally connected to a spherical, fixed mounting member 352 welded to a mounting plate 354 which is bolted to an index actuating arm 356. The mounting member 352 has a through bore aligned with bores in the adjacent ends of the actuator plates 350 that receive the shaft of a bolt 358 which is held assembled by a nut 360. The bores in the mounting member 352 and the plates 350 are oversized with respect to the shaft of the bolt 358 so that the actuator plates 350 are loosely held to the mounting member 352. The plates 350 are biased toward one another and accordingly into engagement with the drive shaft 348 by compression springs 362 which, at their confronting ends, surround disc-like pads 364 on the actuator plates 350. The springs 362 are subjected to an adjustable compression by means of threaded shafts 366 that are received respectively in the opposite arms 368 of a yoke 370. The adjusted compression is maintained by nuts 372. Yoke 370 may be integral with the mounting plate 354.

The index actuator arm 356 extends through an aperture 374 in the tooling mounting plate 218 and is mounted on a shaft 376 journalled for rotation in the main frame plates 64 and 66 and is formed with an L-shape at its end adjacent the sequence control cam 72, the base of the L carrying a cam follower 378 that rides in an index cam channel 380 located in the face of the cam 72 confronting the frame plate 64. The cam channel 380 is so designed that, following the lifting of the ram 270 by the depressor 120, the index actuating arm 356 will be moved in a clockwise direction as viewed in FIG. 5 to cause the drive shaft 348 to be moved downwardly and therby cause a downward motion of the index slide 330. At the extreme bottom end of such downward movement, the pawl 334 will enter an armature slot. Immediately thereafter the index actuator arm 356 will be caused to rotate in a counterclockwise direction as viewed in FIG. 5, whereupon the drive shaft 348 is raised to lift the index slide 330. During this motion of the slide 330, the armature will be forced to index because of the engagement of the pawl 334 in the armature slot.

In order to insure proper operation of index mechanisms of this type it is desirable to cause the index operating parts to overtravel to some extent. This is especially true for machines that are designed to handle various different armature designs. The index mechanism of this invention provides the benefit that the throw of the index slide and accordingly the dog 334 can be accurately controlled by adjustment of the stop nuts 342 and 346. An overtravel of the movement of the index actuating arm 356 is desirable and can be accommodated without undue wear or stress on the machine parts because of the tolerance to motion provided by the spring biased engagement of the actuator plates 350 with the index drive shaft 348. Thus, when the movement of the shaft 348 is stopped, the yoke 370 and accordingly the actuator arm 356 can continue moving for some distance. During such movement, the actuator plates 350 merely rotate about the arcuate upper and lower surfaces of the drive shaft 348.

By virtue of the index construction described, the dog 334 enter an armature slot in preparation for an index when the index slide is not undergoing any motion, i.e., at the end beneath a its downward motion. Therefore, there is no opportunity for the index dog 334 to skip over an armature slot and the dog first engages the core laminations bounding the slot when traveling at low speed.

In summary, the sequence of operation of the machine 40 is as follows. During forward motion of the Scotch yoke carriage 88, the depressor 120 presses down on the coil end turns beneath preselected armature core slot and moves the forward end of the ram 270 downwardly so that the tang 296 is positioned to push a wedge into the preselected armature core slot. Before any substantial return motion of the ram 270, the depressor is raised to thereby raise the ram 270 so that during rearward motion of the carriage 88 insulating material will be fed into the guide cavity 116. Either during the end of the rearward motion or at the beginning of the forward motion of the carriage 88, the knife assembly 118 will be actuated to cut off a wedge 20 and raise the rearward end of the guide cavity 116 to position it for a repetition of the inserting movement of the ram 270. Also during return motion of the carriage 88, the armature is indexed to present a fresh slot in position to receive a wedge.

During the interval in which the machine is being operated to insert wedges into an armature, the main machine drive shaft 56 rotates at a constant speed so that the carriage 88 will be harmonically reciprocating and the control cam 72 will be steadily rotating. After the proximity switch assembly 78 and associated machine control circuitry has counted out the machine cycle after all armature slots have been provided with wedges, a brake pad 382 and a caliper 384 engage the brake disc 70 and at the same time the air operated clutch 52 may be operated to discontinue driving the main drive shaft so that operation of the machine will be discontinued with the parts in readiness for receipt of a fresh armature.

In the embodiment shown in FIG. 11, the machine of FIG. 1 has been modified to insert insulating cell liners 400 into the slots 22 of an unwound armature 24. The cell inserting machine of FIG. 11 is similar to the wedge inserting machine described above. It thus has a drive motor 42 that drives a main drive shaft 56 through the clutch 52. Shaft 56, which may be braked by a disc 70 engaged by a brake pad 382, rotates a control cam 72 and a crank arm 74 for a Scotch yoke carriage 88. The armature positioning apparatus including a stop 28 and the armature indexing mechanism generally designated 122 are preferably the same for both machines.

The cell inserting machine of FIG. 11 differs in that the clutch operating arm 136 is spaced 180° from its position in FIG. 1. Accordingly the overriding clutch 134 operates to drive the lower feed roll 112 during the forward stroke of the carriage 88. The cell liners are formed from insulating strip 402 that may be partly formed by the form and feed rolls 112 and 114 into a V-shaped cross section. The strip 402 is fed through a knife assembly generally designated 404 that may be identical to the knife assembly 118 described above but is mounted upside down from its position shown in FIG. 1 so that the strip 402 will be cut on a downward stroke of the movable knife plate 222. The channel (not shown) formed between the fixed plates 212 and 214 is located so that the insulating strip 402 will be guided into overriding relation to a cell cavity member 406. Suitable guide members (not shown) may be provided for holding the strip 402 centered over the top of the cell cavity member 406. The portion of the strip 402 overlying the cavity member 406 is cut by the knife assembly 404 and then forced downwardly into the cavity member 406 by operation of a tamp blade 408 mounted on a vertically movable tamp plate 410. The plate 410 may be constructed substantially identically to the depressor 120 except that it is designed to support the tamp blade 408. Of course, a coil depressor is not needed in the machine of FIG. 11 since the cell liners are inserted before any coils are wound in the armature.

The tamping of the cut strip into the cell cavity causes the strip to conform substantially to the configuration of the liner 400. The cavity 406 is provided with a nose piece 412 having an opening 414 that is shaped to conform to the shape of the armature core slots 22 but is of smaller dimension so that, as the liner 400 is forced through the nose piece 414, it will be reliably guided into an armature core slot 22. The liner 400 is pushed out of the cavity 406 by a tamper blade 416 which in this case consists of a relatively thin elongate metal strip that is appropriately guided to enter the rearward end of the cavity member 406 upon the forward stroke of the carriage 88. In contrast to the ram 270 of the wedge inserting machine described above, the cell ram 316 is located beneath the path of the insulating strip 402. Accordingly, the ram could not interfere with the feed of the strip and it is not necessary to provide for the raising or lowering of the ram.

The operating sequence of the cell liner inserting machine of FIG. 11 is as follows. Prior to substantial forward stroke of the carriage 88, the cut strip material is tamped by a lowering of the tamp blade 408 into the cell cavity 406. The tamp plate is then raised. During the forward stroke of the carriage 88, the ram 416 enters the cell cavity 406 and forces the liner 400 therefrom into an armature slot 22. At the same time, a length of insulating strip is fed over the cell cavity 406. As the carriage 88 returns or moves rearwardly, the insulating strip is cut by operation of the knife assembly 404 and the lowering of the tamp blade 408 begun. At approximately the same time the armature is indexed to present another slot in position to present another slot in position to receive a liner 400.

Although the presently preferred embodiments of this invention have been described, it will be understood that within the purview of this invention various changes may be made within the scope of the appended claims.

Having thus described our invention, we claim:

1. Apparatus for inserting insulating members into the slots of dynamoelectric machine members, the apparatus being of the type wherein a strip of insulation material is fed along a predetermined path, a length of said material is cut by a knife assembly to form said insulating member, said insulating member is inserted into a slot in the machine member, and the machine member is then rotated about its axis by index means to position another slot for receiving another insulating member, the improvement wherein said apparatus includes a carriage mounted for movement along a path substantially parallel to the path of movement of said strip, said machine member being supported in substantial alignment with said path, means supporting said knife assembly between said carriage and said machine member, Scotch yoke drive means for reciprocally moving said carriage along said path toward and away from said machine member, means responsive to movement of said carriage for feeding said strip toward said machine member so that its leading edge is moved past said knife assembly, means for operating said knife assembly in timed relation to the movement of said strip to cut said insulating member from said strip, and a ram mounted on said carriage for pushing said insulating member into one of said slots as the carriage moves toward said machine member.

2. The improvement of claim 1 wherein said means for moving said carriage includes a main drive shaft, a Scotch yoke crank having a cam follower mounted on said drive shaft, and means defining a slot on said carriage for receiving said cam follower.

3. The improvement of claim 2 further comprising sequence control cam means driven by said main drive shaft and wherein said means for operating said knife assembly comprises cam follower means driven by said control cam means.

4. The improvement of claim 3 further including cam follower means driven by said cam means for operating said index means.

5. The improvement of claim 2 further including a cavity member for forming said insulating member and means for tamping said insulating member into said cavity member, said means for tamping said insulating member being operated by cam follower means driven by said sequence control cam.

6. The improvement of claim 1 wherein said means responsive to movement of said carriage for feeding said strip comprises a rotatably mounted shaft, a strip feed roll mounted on said shaft for rotation therewith, an overriding clutch on said shaft, a clutch operating arm connected to said clutch, and cam follower means driven by said carriage for driving said clutch operating arm.

7. The improvement of claim 1 further comprising means for depressing wires on said machine member at the end of the slot in which an insulating member is to be inserted.

8. The improvement of claim 7 wherein the rearward end of said ram is pivotally mounted on said carriage and wherein said means for depressing includes a vertically movable plate member having an aperture, the forward end of said ram projecting through said aperture so that said ram is pivoted in response to the vertical movements of said plate member.

9. The improvement of claim 1 further including a guide cavity for receiving the leading end of said strip and for guiding the cut insulating members into the slots of said machine member, said knife assembly including movable means engaging said guide cavity for positioning said guide cavity in alignment with said ram.

* * * * *

UNITED STATES PATENT AND TRADEMARK OFFICE
CERTIFICATE OF CORRECTION

PATENT NO. : 4,136,433

DATED : January 30, 1979

INVENTOR(S) : Francis E. Copeland, Glen E. Buckholtz and Hyman B. Finegold

It is certified that error appears in the above-identified patent and that said Letters Patent are hereby corrected as shown below:

Col. 6, line 26, after "upon the" insert ---upper---.

Col. 9, line 35, "therby" should be ---thereby---.

Col. 9, line 65, after "334" insert ---can---.

Col. 9, line 67, change "beneath a" to ---of---.

Signed and Sealed this

First Day of May 1979

[SEAL]

Attest:

RUTH C. MASON
*Attesting Officer*

DONALD W. BANNER
*Commissioner of Patents and Trademarks*